United States Patent [19]

Pyzik et al.

[11] Patent Number: 4,702,770
[45] Date of Patent: Oct. 27, 1987

[54] MULTIPURPOSE BORON CARBIDE-ALUMINUM COMPOSITE AND ITS MANUFACTURE VIA THE CONTROL OF THE MICROSTRUCTURE

[75] Inventors: Aleksander J. Pyzik; Ilhan A. Aksay, both of Seattle, Wash.

[73] Assignee: Washington Research Foundation, Seattle, Wash.

[21] Appl. No.: 759,411

[22] Filed: Jul. 26, 1985

[51] Int. Cl.$^4$ ............. C22C 29/02; B22F 3/26; B22F 3/12

[52] U.S. Cl. ............................. 75/236; 419/2; 419/17; 419/23; 419/27; 419/45; 419/47; 419/29; 428/375; 428/704; 428/549

[58] Field of Search ............ 419/17, 29, 2, 45, 47, 419/23, 27; 75/236, 238; 428/552, 549, 375, 704; 420/528, 529, 531, 532, 533, 537; 501/87, 127

[56] References Cited

U.S. PATENT DOCUMENTS

| | | | |
|---|---|---|---|
| 2,746,133 | 5/1956 | Lowe | 419/17 |
| 3,364,152 | 1/1968 | Lipp | 419/17 |
| 3,725,015 | 4/1973 | Weaver | 419/17 |
| 3,749,571 | 7/1973 | Stibbs | 419/17 |
| 4,104,062 | 8/1978 | Weaver | 419/17 |
| 4,605,440 | 8/1986 | Halverson et al. | 75/238 |

Primary Examiner—Stephen J. Lechert, Jr.
Assistant Examiner—J. E. Thomas
Attorney, Agent, or Firm—Seed and Berry

[57] ABSTRACT

Low-density composites are produced consisting chiefly of boron carbide and aluminum, or aluminum alloy, and minor amounts of ceramic material. The method allows control of the rate of reaction between boron carbide and metal so that the final components of the composite, and hence the mechanical properties, are controlled. The invention includes modification of the carbon content of the boron carbide composition, dispersion of boron carbide and formation of a compact, infiltration of the compact by aluminum or aluminum alloy, and heat treatments. The invention produces low-density boron carbide-aluminum composites with a homogeneous microstructure possessing desired mechanical properties.

37 Claims, 12 Drawing Figures

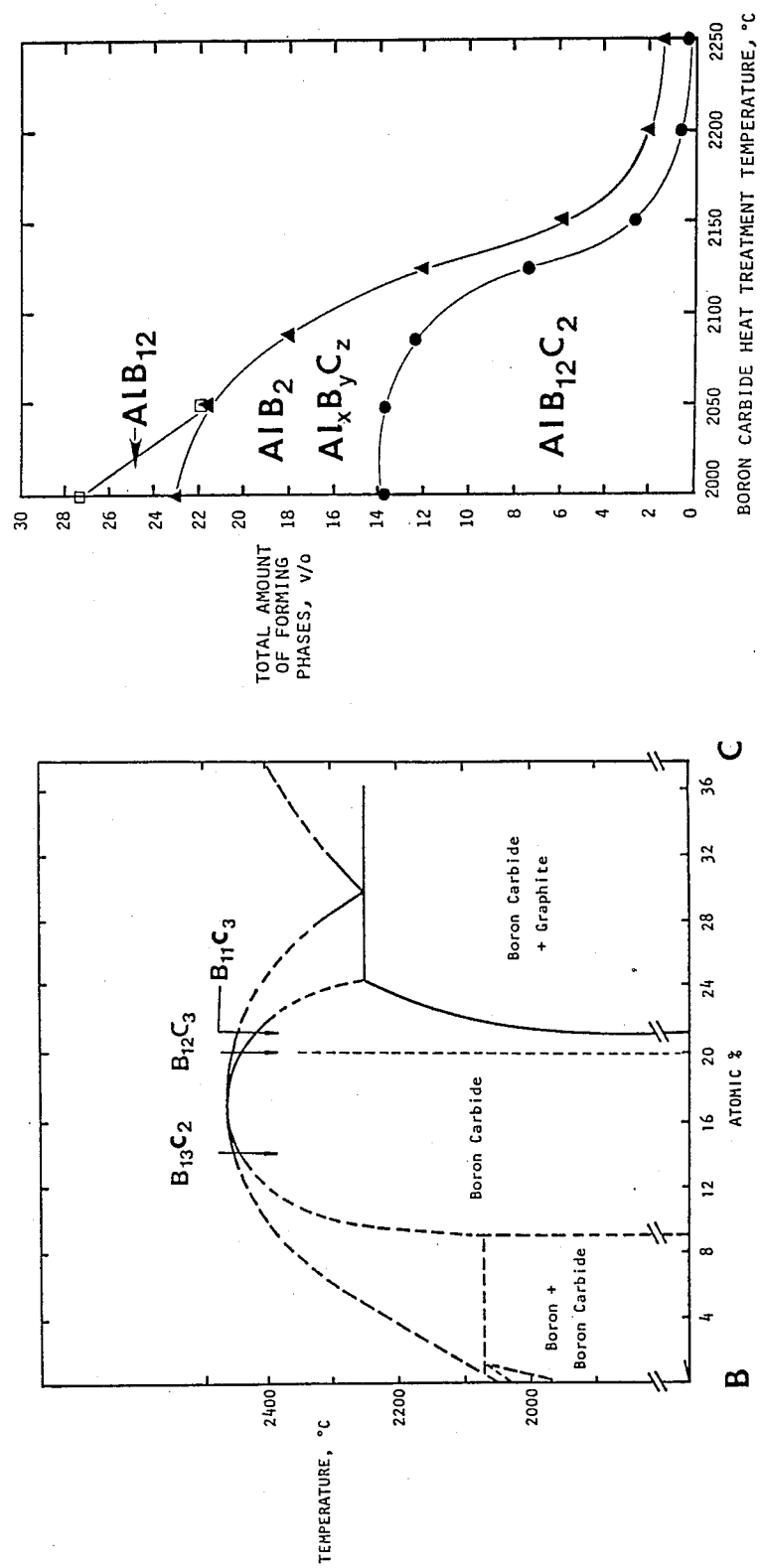

MULTIPURPOSE BORON CARBIDE-ALUMINUM COMPOSITE AND ITS MANUFACTURE VIA THE CONTROL OF THE MICROSTRUCTURE

DESCRIPTION

The United States Government has rights to this invention pursuant to Contract No. AFOSR 83-0375, awarded by the Defense Advanced Research Project Agency (No. 45831) and the Air Force Office of Scientific Research (No. 83-0375).

1. Technical Field

The invention relates to boron carbide-metal composites. More particularly, the invention is concerned with low-density boron carbide-aluminum composites, methods of making them and their articles of manufacture.

2. Background Art

Boron carbide is a low-density material that is hard and extremely stiff. However, its widespread use has been limited by its extreme susceptibility to brittle fracture and the difficulty in obtaining a completely densified, uniform material that contains no significant internal structural defects. Researchers have known that combining boron carbide with a metal could solve the recognized difficulties with boron carbide. For example, tungsten carbide-metal composites such as WC-Co and WC-TiC-Co are known. However, all these composites have high densities, above 10 g/cm$^3$, thus defeating the goal of obtaining a strong low-density material.

Researchers have focused on aluminum because of its light weight, ready availability and reactivity with boron carbide under reasonable processing conditions. Boron carbide-aluminum composites are described by Lowe, U.S. Pat. No. 2,746,133; Bergen, U.S. Pat. No. 3,178,807; Lipp, U.S. Pat. No. 3,364,152; Weaver, U.S. Pat. No. 4,104,062; and Gazza in U.S. Pat. No. 3,864,154, for example. However, none of the researchers has been successful in producing products which may be easily manufactured.

Moreover, significant problems remain in controlling the character and quantity of each component present in the final boron carbide-aluminum composite. For example, there is difficulty in establishing proper reaction conditions so that there is "wetting" contact and thus reaction between aluminum and boron carbide. The reaction rates for available boron carbide are so fast that control of the reaction to achieve desired finished composite properties has been substantially impossible. The reaction depletes most of the metal present in the boron carbide-aluminum article, yielding many ceramic phases, some of which are large and brittle, adversely impacting overall composite properties.

A second problem lies in the limited knowledge available in combining boron carbide and aluminum in a manner which produces structurally homogeneous, wholly densified products. Researchers have attempted to mix agglomerated boron carbide and metal powders and have found that uniform dispersion is often not achieved. The result is large voids in the consolidated compact or article. These pores often end up as closed rigid ceramic envelopes, excluding metal flow, preventing the material from obtaining full density. Even when the pores are open, their large size may result in large empty spaces because the liquid aluminum metal tends to migrate to the finer openings and channels due to capillary action.

Recent prior work, described by Halverson and the present inventors in U.S. Pat. No. 4,605,440 has addressed the preparation of boron carbide-aluminum cermets. However, to date, the problems of controlling reaction kinetics to produce structurally homogeneous boron carbide-aluminum composites having low density, high fracture toughness, and high strength have not been solved.

DISCLOSURE OF INVENTION

It is an object of the invention to produce low-density boron carbide-aluminum composites that possess high fracture toughness, fracture strength, high hardness, and stiffness.

It is an object of the invention to provide composites which can be tailored to required mechanical properties or specifications by adjusting, as desired, composition of the various phases in the finished composite. Composite microstructures may be further modified to achieve structures ranging from matrix distributions of ceramics and metal to interconnected continuous or "skeletal" distributions of ceramic and metal.

It is an object of the invention to produce boron carbide-aluminum composites of unique composition, including composites which retain an aluminum metal phase in the finished material, which directly improves composite properties such as fracture toughness and strength. This result is attained by methods of the invention which substantially reduce reaction rates between boron carbide and aluminum. The reaction may be stopped at any composition which has desirable qualities.

Composites that are fully densified, i.e., without voids, are obtained. Previous boron carbide-aluminum composites have been produced by the mixing of agglomerated boron carbide and metal powder. The mixture is heated to allow melting of the aluminum and reaction between the boron carbide and aluminum. Because the rate of reaction is greater than the rate of movement of liquid aluminum throughout the boron carbide agglomerates, the densification is incomplete.

This problem is depicted in FIG. 12. FIG. 12a represents agglomerates of solid aluminum powder 10 and agglomerates of boron carbide 12 with irregular spaces between the particles 14. In FIG. 12b, heating has caused the liquid aluminum to migrate into the smaller spaces via capillary action. As the aluminum moves throughout the agglomerates, it reacts rapidly with the boron carbide to produce multiphase ceramic material bridges 16. The reaction continues, depleting all aluminum, and producing rigid envelopes of multiphase ceramic material, as shown in FIG. 12c. Within the closed envelope is an empty pore 18 into which liquid aluminum cannot flow.

This problem is solved in the present invention. Boron carbide is dispersed and consolidated into a porous compact. The compact consists solely of boron carbide and is of uniform density. The compact is then subjected to infiltration by aluminum or aluminum alloys at elevated temperatures. The metal moves rapidly throughout the boron carbide to produce a composite of boron carbide and metal. Boron carbide and aluminum do react to form minor amounts of ceramic material, primarily AlB$_{12}$C$_2$; however, the rate of reaction is less than the rate of densification. Accordingly, the final composite consists chiefly of boron carbide and aluminum, or aluminum alloy, with only minor amounts of AlB$_{12}$C$_2$, rather than multiphase ceramic material with little or no remaining aluminum and boron carbide, as has been produced by previously disclosed methods. Complicated article shapes are possible, with no shrinkage resulting in the final product.

The composites may be changed in composition to achieve desired properties by heat treating, which modifies composition microstructure. Previous boron carbide-aluminum composites reacted so rapidly once wetting or reaction temperatures were achieved that little control of the microstructure through heating regimes was possible. All aluminum was uncontrollably depleted in such composite making processes.

In accordance with the invention, the rates of reaction of boron carbide with aluminum are substantially reduced by heating the boron carbide to 1800°-2250° C. in the presence of free carbon, preferably graphite. The resulting carbon-enriched boron carbide may then be reacted with aluminum metal to produce desired composites.

An improved method of reacting boron carbide with aluminum calls for dispersing particulate boron carbide in water, or an organic medium, under conditions maximizing electrostatic and/or steric-repelling forces between particles, either with or without graphite present. The boron carbide is next consolidated, for example, by slip casting, resulting in a porous compact. The compact is then contacted with liquid aluminum wherein aluminum is distributed throughout the porous compact. Preferably, the compact is submerged in a bath of liquid aluminum.

A number of heat treating processes are employed to achieve a final desired composite microstructure. Where ceramic structures are desired, heat treating is conducted simultaneously with or after infiltration at temperatures ranging between 800°-1350° C. Where it is desired that the microstructure retain a metal phase, the porous compact is sintered at about 1800°-2250° C. prior to infiltration to modify the carbon and enrich the boron carbide. Postinfiltration heat treating in the 800°-1350° C. range then determines final structure, depending upon the desired finished composite properties.

A number of unique composites are obtained by means of the described methods. Fully ceramic composites may be obtained which include principally boron carbide and $AlB_{12}C_2$, $AlB_{12}$, $AlB_2$ and $Al_xB_yC_z$, phase X. Boron carbide composites of the partially ceramic type may be produced that are principally limited to boron carbide, aluminum and $AlB_{12}C_2$ phases, for example. Composites which retain phases which are principally boron carbide and aluminum metal are possible. Heat treatments may modify aluminum phase composite microstructures from matrix-type distributions of boron carbide and aluminum to microstructures retaining the aluminum and ceramic phases, but which are of an interconnected, continuous type.

BRIEF DESCRIPTION OF THE DRAWINGS

FIG. 7 is a boron carbon phase diagram accord-ing to Beauvy (M. Beauvy, *The Less Common Metals,* 90, pp. 169-175, 1983).

FIG. 8 demonstrates the relationship between the kinetics of chemical reaction in a boron carbide-aluminum system and the temperature of boron carbide heat treatment.

BEST MODE FOR CARRYING OUT THE INVENTION

The invention is directed to boron carbide-aluminum composites wherein aluminum has been successfully introduced in a manner which imparts high fracture tough-ness and strength to the composite while preserving boron carbide's low density, high hardness and high stiffness. The methods of the invention also eliminate processing difficulties in reacting boron carbide with aluminum which result from the high rate of reaction between conventional boron carbide and aluminum, which rate has heretofore resulted in substantially uncontrolled reactions producing composites of limited utility. The invention also overcomes mechanical processing difficulties in mixing or dispersing the boron carbide with aluminum which has caused formation of composites which include voids that seriously weaken products.

In order to obtain densification of articles and maximize desired mechanical properties, wetting between the boron carbide and aluminum must occur. In this system, wetting does not take place at a sufficient rate below 1,000° C. At temperatures above 1,000° C., a chemical non-equilibrium condition is established and mass transport across the boron carbide-aluminum interface occurs.

The conditions favoring the wetting necessary for densification are thus also associated with chemical reaction between boron carbide and aluminum. Boron carbide-aluminum composites belong to a category of incompatible systems where ceramic and metal cannot coexist in an equilibrium state.

In addition, the boron carbide-aluminum system is highly reactive and characterized by fast chemical reaction kinetics leading to rapid liquid metal depletion. However, in order to produce composites of desired properties, the rate of reaction must be controlled. In prior work, chemical reaction kinetics were so fast that only relative amounts of forming phases could be controlled, but the ultimate composition of the phases in the composite could not be controlled.

The present invention recognizes the importance of the kinetics of the chemical reaction in determining final composite properties. In its several embodiments, the invention defines methods which allow control of the mechanical properties of the composites by either altering reaction rates or at least partially avoiding impact of the high rate regimes. The system mechanics are controlled to the extent that microstructures are obtained wherein a metal phase may be retained in the final product in a desired amount.

Figure 1:
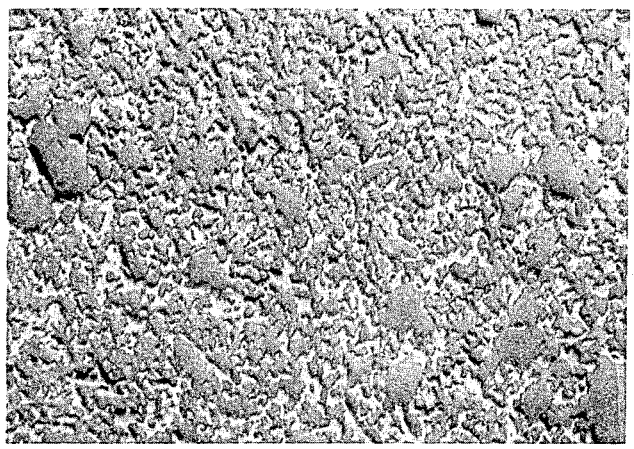
FIG. 1 is an optical micrograph showing a boron carbide-aluminum composite of the metal matrix-type microstructure.
Figure 2:
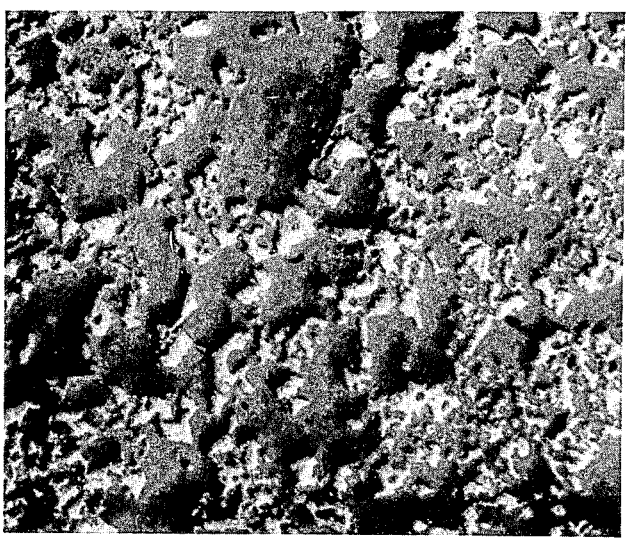
FIG. 2 is an optical micrograph showing the sample of FIG. 1 wherein heat treating has modified the microstructure to an intermediate structure.
Figure 3:
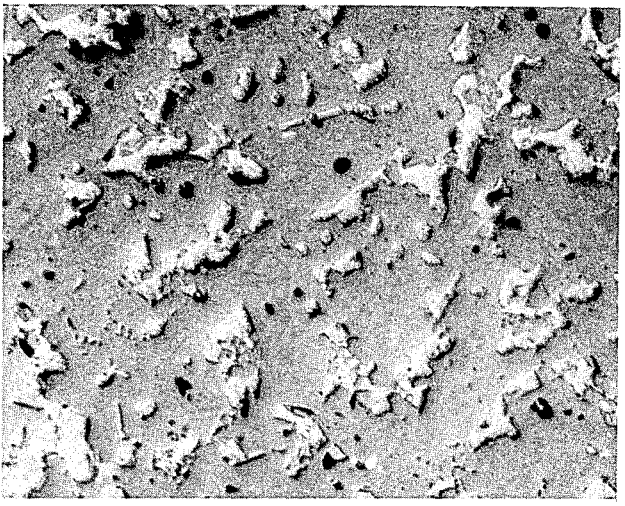
FIG. 3 is an optical micrograph showing the sample of FIG. 1 wherein heat treating has modified the microstructure to the interconnected, continuous, skeleton-type structure.
Figure 4:
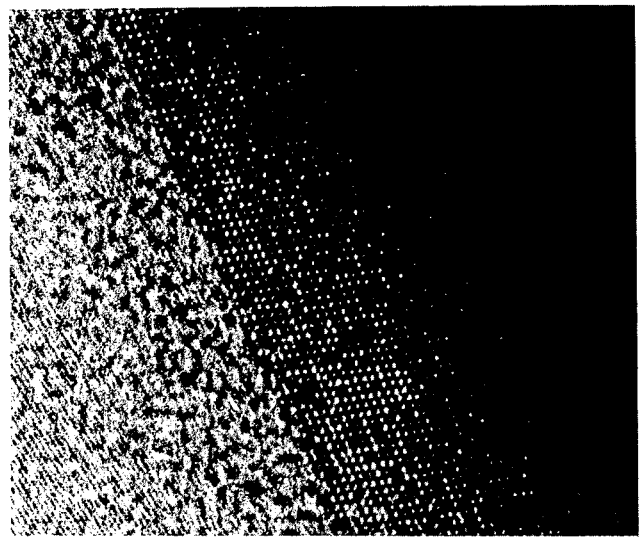
FIG. 4 is an electron micrograph of the smooth boron carbide-aluminum interfaces possessed by composites of the invention.

Referring to FIGS. 1-3, microstructures of unique boron carbide-aluminum composites of this invention are shown. In the three figures, the sample is identical, having been subjected to a series of heating steps to the different forms shown. The lighter material is aluminum metal remaining in the finished composite in various controllable forms. FIG. 4 is an enlargement of the interface between the boron carbide and aluminum phases. The interface is much different from that in conventional boron carbide-aluminum composites in that the new composite has a smooth, clean interface between the phases. The smooth interface results because the formation of reaction compounds at the interface can be controlled and minimized. By controlling reaction kinetics, the present invention produces boron carbide-aluminum composites where the major constituents are boron carbide and aluminum, not multiphase ceramics, as has been the case in earlier methods.

Figure 5:
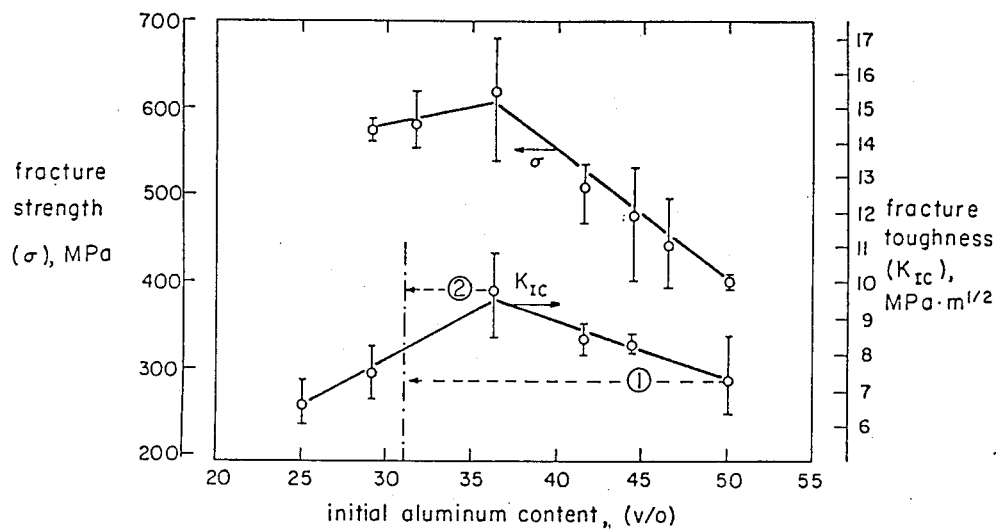
FIG. 5 demonstrates the relationship between initial composite aluminum content and fracture toughness, and fracture strength, desired composite properties.
Figure 10:
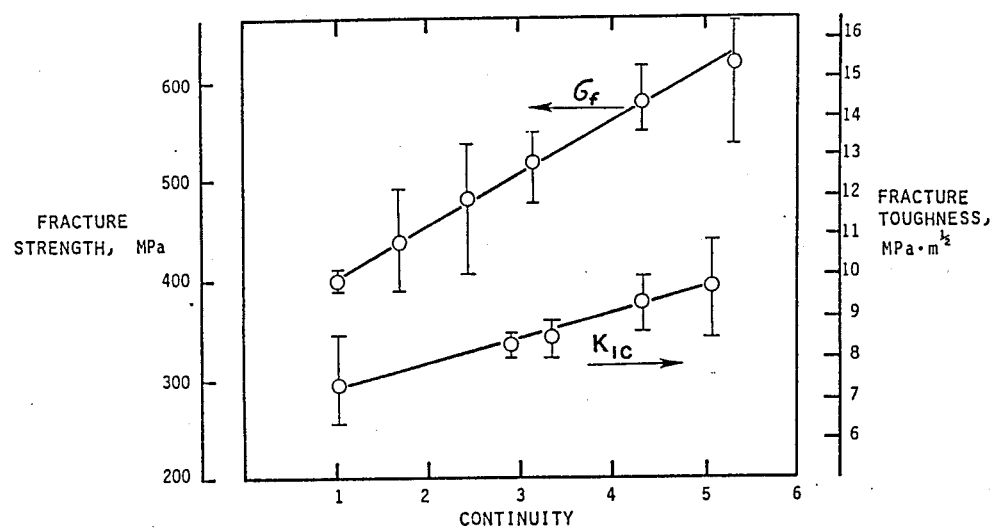
FIG. 10 shows the relationship between continuity, fracture toughness and fracture strength.

The ability to retain aluminum in the boron carbide-aluminum composite and the character of the impact on producing composites that have high fracture toughness and fracture strength, as shown in FIGS. 5 and 10 and reported in the examples below. The finished composite is considerably different in structure and mechanical properties from all other prior boron carbide-aluminum composites.

The key elements of the invention which permit control of the reaction kinetics of the boron carbide-aluminum reaction and permit achievement of desired physical properties in the composite are:

(1) Modifying the carbon content of the boron carbide composition through heat treatment in the presence of graphite or some other free carbon such that the atomic percent of carbon in the boron carbide approaches the limits of boron carbide's solid solution limit at the carbon end of the scale. The effect of this modification is to drastically reduce the reaction rate between the carbon-enriched boron carbide and the aluminum.

(2) The method by which boron carbide and aluminum are mixed which provides 100% densification and homogeneous dispersion of the carbides and borides.

Once homogeneous mixing and wetting of boron carbide with aluminum have occurred, heat treatment regimes are implemented to achieve a finished microstructure that possesses desired properties. The method of the invention allows selection of either conventional fast-reaction kinetics between boron carbide and aluminum or slow-reaction kinetics employing the carbon-enriched boron carbide material. In the fast-reaction system, the ultimate product will be comprised of a plurality of ceramic phases with the aluminum depleted; however, difference with respect to previous inventions is that now the kinetics of densification are faster than the kinetics of chemical reaction. As a result, metal depletion takes place in an already dense composite, which eliminates defect formation.

In the slow-reaction kinetic system, the ultimate microstructure may retain a selected amount of a metal aluminum phase. Presence of the aluminum may be adjusted by further heat treating regimes to achieve desired physical and mechanical properties. Producing the unique boron carbide-aluminum composites of the invention is accomplished by the following method steps:
1. A porous boron carbide compact from a homogenous dispersion of boron carbide, without the aluminum component, is achieved using colloidal consolidation techniques;
2. The boron carbide composition of the compact is modified, enriching it with carbon, by heat treating or sintering the boron carbide in the presence of graphite. The heat treatment sinters the previously dispersed boron carbide, establishing an initial boron carbide to aluminum ratio in the composite.
3. Aluminum is brought into contact with the boron carbide by an infiltration method which ensures the formation of a fully dense, boron carbide-based composite.
4. The final composite microstructure, that is grain size, continuity, and spatial distribution, is controlled by heat treating regimes.

Understanding and controlling the chemical reaction rate between boron carbide and aluminum permit achievement of desired phases and properties of the finished composite. Heat treating permits the development of a continuum of microstructural variation in a boron carbide-aluminum composite with further resultant changes in mechanical properties.

A. Dispersion and Consolidation

The boron carbide dispersion technique requires that boron carbide particulates be mixed homogeneously to form, after consolidation, a porous body with homogeneously distributed boron carbide grains.

The dispersion technique discovered avoids the difficulty of combining small boron carbide particulates with highly reactive metal particulates. Some metal particulates, such as aluminum smaller than 25 $\mu$m, are explosive, creating handling danger. Many metals of interest, including aluminum alloys, are difficult to obtain in suitable particulate form. Combining the particulate materials in the past has involved collodial co-dispersion techniques often requiring organic solvents, which likewise create handling hazards and can be sources of pollution. The method of the invention chosen for mixing aluminum with the boron carbide avoids the difficulties in having to mix and handle difficult-to-process particulates.

Figure 6:
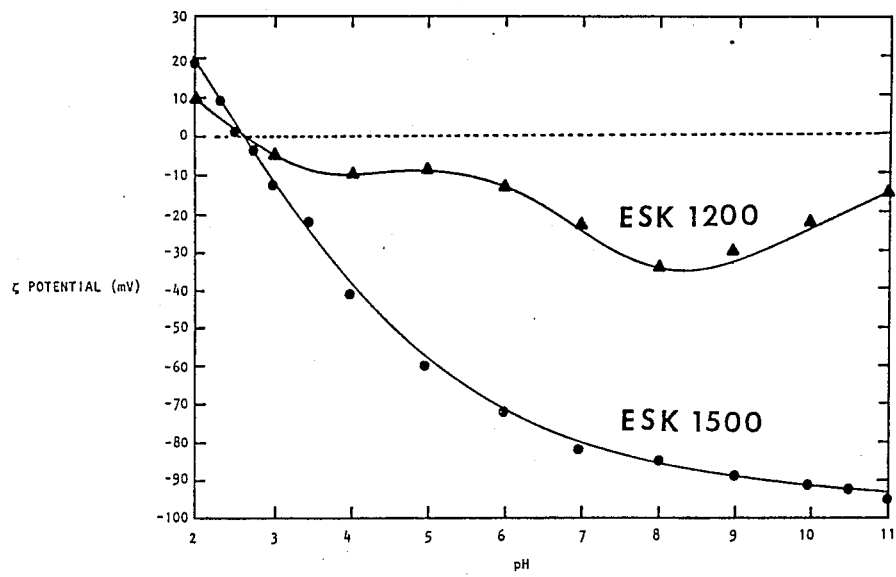
FIG. 6 illustrates the relationship between pH and zeta potential for boron carbide.

The method of the invention requires that the boron carbide particulate should be smaller than 10 $\mu$m. Smaller particulates result in better suspension stability and homogeneity of packing. In general, a particulate size of about 1 $\mu$m is preferred. The particulate boron carbide is mixed with water that is adjusted in pH to control electrostatic particle surface charges which fundamentally depend upon particle surface characteristics. The surface charges may be estimated by a measurement of zeta potential values. High zeta potential values are preferred and indicate that maximum particle-repelling charges assist in dispersing the boron carbide throughout the liquid medium. In general, zeta potential of boron carbide increases with pH, although not necessarily linearly. This is shown in FIG. 6. Zeta potential values differ considerably from batch to batch as a result of differences in surface characteristics.

For example, in a five μm boron carbide suspension, best results are obtained at a pH of 7-8, resulting in a suspension solid content of 27%. A boron carbon powder of 1 μm average diameter particulate can be suspended in water at a pH of 5-11 to give suspension solid contents of 45-55%. A measure of zeta potential indicates that best dispersion is obtained at a pH of 10, with the strong repulsive forces acting between the particulates improving suspension stability.

Additional suspension processing steps may be applied to meet special conditions. For example, agglomerates may be broken up by applying ultrasonic vibration techniques for 2-5 minutes. Suspensions are typically aged for a period of time while being continuously stirred. Suspension are then degassed in a desiccator at 35 millitorrs vacuum for about 30 minutes.

After homogeneous dispersion is accomplished, the suspension is consolidated to form a porous compact, often called a "greenbody." Consolidation removes the water, resulting in a boron carbide structure that is porous and suitable to receive a liquid metal reactant. A number of consolidation techniques can be used, such as slip casting in porous molds, pressure slip casting, or injection molding. A preferred laboratory technique is slip casting in plaster of Paris molds.

B. Heat Treatment and Densification

A key element in the process and forming products of the invention is the ability to select reaction rates by which boron carbide combines with aluminum. The key element in the ability to adjust reaction rates lies in the discovery that boron carbides that have high carbon contents are characterized by relatively very slow reaction rates with aluminum. A "high carbon content" is defined as that approaching the limits of the boron carbide's solid solution range at the carbon-rich end. Boron carbide exhibits a wide solid solution range. As shown in FIG. 7, the carbon content of the boron carbide solid solution ranges from 9 or 10 to 21.6 carbon atomic percent, based on current knowledge of the boron-carbon phase diagram. The carbon-rich limit of the boron carbide phase is $B_{3.63}C$, approximately $B_{11}C_3$. Commercially available boron carbide is conventionally a mixture of $B_{12}C_3$, at 20% C, and $B_{13}C_2$, 13.8% C. This boron carbide reacts strongly with aluminum, resulting in a variety of binary and ternary compounds, including $AlB_2$, Alpha and Beta $AlB_{12}$, $AlB_{12}C_2$, $AlB_{24}C_4$, $Al_4B_{1-3}C_4$, $Al_3B_{48}C_2$, $AlB_{48}C_2$, $AlB_{40}C_4$, and $Al_4C_3$.

However, by shifting the boron carbide composition to the limit of the boron carbide's solid solution range at the carbon-rich end, the kinetics of the boron carbide-aluminum reaction and the types of reactions are drastically changed. As a result, at a temperature range of 900°-1225° C., carbon-rich boron carbide reacts with aluminum, forming principally $AlB_{12}C_2$ and $Al_xB_yC_2$ (phase X), rather than a multitude of phase indicated above. The reaction kinetics are very slow in comparison with conventional boron carbide-aluminum reactions. The reaction rate is such that clean boron carbide-aluminum interfaces of the type shown in FIG. 4 are achieved. As FIG. 8 illustrates, the reaction rates are such that liquid metal phases may be retained in the finished boron carbide-aluminum composites, in contrast to fast-reaction regimes where a wide variety of ceramic phase results and all aluminum metal is depleted, introducing these phase.

The carbon-rich boron carbide is most conveniently produced by heat treating conventional boron carbide possessing a composition below 20 atomic percent of carbon in the presence of graphite to achieve a carbon enriched-boron carbide including at least about 20 atomic percent carbon. An alternative, of course, is that the boron carbide be manufactured in a way such that the finished material is approlaching the limit of the boron carbide's solid solution range at the carbon-rich end. The enriching process heat treatment is conducted at 1800°-2250° C. The composition change is a diffusion-controlled process. At 2200° C., the enriching process is completed in about 25 minutes. At 2150° C., a 30-45 minute treatment is required to achieve completion.

The heat treatment can be conducted with boron carbide in a loosely packed powder form. Preferably, the boron carbide is consolidated into a porous compact, a convenient technique for subsequent formation into composite articles. In the first case, the resulting carbon-enriched boron carbide will likely have to be ground in order to break up agglomerates. In the consolidate state, the sintered compact is ready for subsequent reaction with aluminum in a form that will produce a useful article without shrinkage. Where the carbon-enriching heat treatment is carried out after the boron carbide has been consolidated, the various temperature conditions must be established beforehand, since there will be impact on the finished product microstructure.

An absolute limit of the sintering stage temperatures is that all voids after sintering must remain open to receive liquid infiltration. Therefore, selecting the proper carbon-enriching temperature must be related to time, grain size, final density desired, amount of graphite present (if any), among other parameters of interest. For example, sintering of a 5 μm particulate boron carbide may be done at 2200° C. A lower sintering temperature of 2100° C. is required for 1 μm material to avoid closing the pores of the more tightly packed particulate. The sintering conditions must be balanced to achieve the compositional change, yet avoid pore-closing difficulties which would have a significant impact on the final mechanical properties. As a further example, boron carbide (1200 grit, green density of 48-51%) achieves densities in the range of 50-69% when sintered between 2050°-2200° C. for 30 minutes. Boron carbide of 1500 grit, greenbody density of 66-68%, achieves densities of 75-91% as a result of sintering for 30 minutes at 2050°-2200° C.

C. Infiltration

It was observed in dealing with composite powder compacts that if packing density inhomogeneties were not completely eliminated, the metal phase upon melting moved into denser regions of the compacts by capillary suction. Thus, regions which were initially occupied by the metal phase remain as pores in composites. When these pores are larger than approximately 5 μm, pressure sintering is required for densification approximating full density. In the elimination of this problem, prior workers employed colloidal co-dispersion and consolidation techniques. However, this approach is successful only if the starting powders are free of hard agglomerates and are in the submicron size range.

Applicants have discovered an alternative approach which avoids previous difficulties. The process requires initially forming a porous compact by well-known consolidation techniques. The uniformly porous ceramic compact is densified by infiltrating the compact with molten metal, achieving a uniformly dispersed and fully dense composite material. The advantages are many, including eliminating flammable solvents and submicron size aluminum, typical of co-dispersion techniques. The infiltration technique permits the employment of any aluminum alloy which may otherwise be difficult to obtain in a submicron size. Complicated shapes can be formed and further machining is not required because shrinkage does not take place. The technique is simple and inexpensive.

A preferred infiltration of porous boron carbide compacts can be achieved by sumerging the compact in a liquid metal bath. Alternatively, chunks of metal can be placed on the top or bottom of the boron carbide compact followed by heating together. When the contact angle of the metal drops below 90°, the liquid wets and permeates the compact. The rate of liquid permeation is proportional to pore radius, liquid surface tension, contact angle, and void ratio, and inversely proportional to the liquid viscosity.

While liquid surface tension and viscosity are difficult to control three mechanisms are possible to regulate liquid penetration. Parameters which may be limited are pore radii, which depend upon particulate size and geometry of particulate packing. The degree of wetting measured by contact angle between boron carbide and aluminum may be controlled by selecting temperature and time of infiltration. The void ratio may be controlled by regulation of consolidation techniques and sintering conditions.

As noted above, the infiltration technique permits the introduction of aluminum alloys into the porous boron carbide compact. For example, Al-Cu, Al-Mg, Al-Si, Al-Mn-Mg and Al-Cu-Mg-Cr-Zn are of interest with respect to the mechanical properties they impart to finished composites. The best overall mechanical properties are obtained where the retained aluminum alloy phase is in the 10–25% range.

The preferred temperature window for infiltration of aluminum alloys into boron carbide compacts is 1150°–1250° C. Above 1250° C., infiltration is still possible; however, rapid evaporation of metal takes place. For each alloy, exact temperature and time of infltration can be estabilshed by contact angle measurements to determine when wetting conditions are achieved.

The infiltration is best conducted under a non-oxidizing atmosphere or vacuum. Processes can take place in vacuum furnaces, including, if desired, graphite elements. A preferred process uses a graphite furnace and a vacuum of 1–20 millitorrs.

Infiltration time is dependent on several factors, such as packing density, pore radius, void ratio, contact angle, viscosity, surface tension and sample size. For example, a 2" long compact may require 10–75 minutes, depending upon preinfiltration processing conditions.

D. Microstructure Control

The process of the invention permits mechanical properties of the finished composites to be tailor-made to desired values. A key element in how tailoring is accomplished involves the use of heat treating techniques which change the final microstructure of the composite in profound ways. For example, FIG. 10 demonstrates the relationship between fracture toughness, fracture strength, and continuity. Employing the carbon-enriched boron carbide compound in addition to the aluminum infiltration process greatly multiplies the range of composite structures that may be obtained through heat treatment regimes. By the methods of the process of this invention, the boron carbide-aluminum system microstructure can be controlled in three ways.

The first control process may retain the conventional high kinetic rate of reaction of boron carbide with aluminum but use the porous compact-liquid aluminum infiltration technique to achieve a degree of control over final microstructures. In this regime, heat treatments are lower than 1800° C. The heat treatment process is generally combined with the infiltration technique. In general, the process produces a microstructure in which the metal is depleted to form a fully dense, 100% ceramic body in which boron carbide grains are surrounded by other ceramic phases, such as $AlB_{12}$, $AlB_{12}C_2$, $AlB_2$, and a structurally and compositionally undefined $Al_xB_yC_z$, phase X. The ratio of the ceramic phases can be altered, depending upon heat treating conditions.

For example, by applying heat treatments between 1000°–1100° C. for 1–100 hours, the main phases obtained are boron carbide and $AlB_{12}C_2$. Heat treating at 900° C. results in the formation of $AlB_{12}C_2$, phase X, and $AlB_2$ phases. A heat treatment at 800° C. results in formation of $AlB_2$ and phase X.

Figure 9:
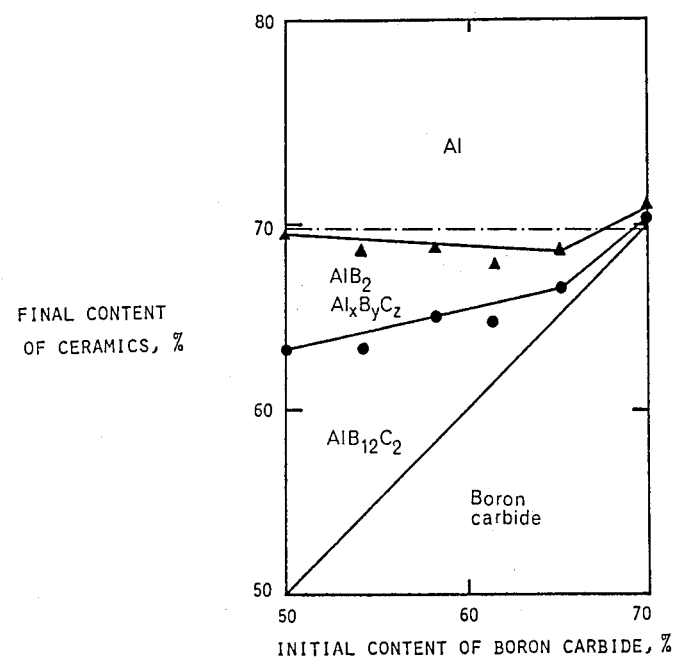
FIG. 9 illustrates the relationship between initial boron carbide content and final ceramic content in the boron carbide-aluminum system.
Figure 11:
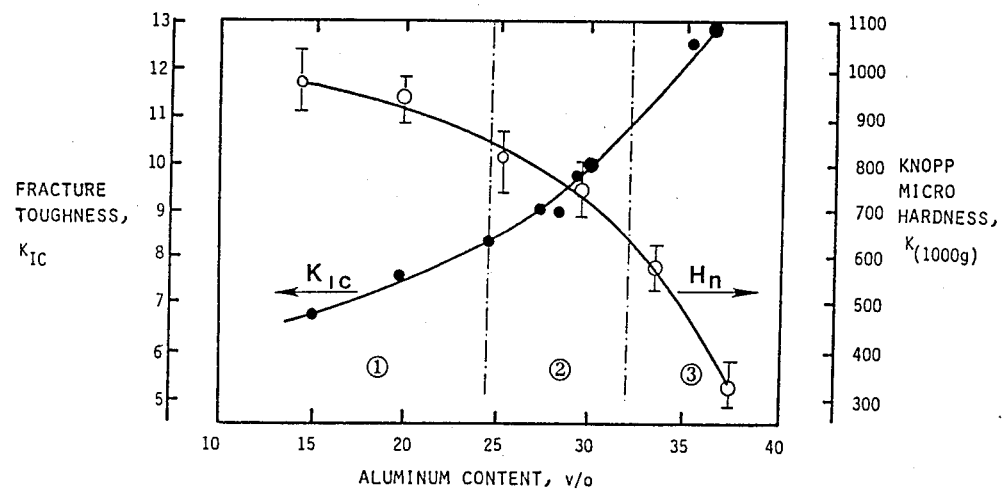
FIG. 11 demonstrates the relationship between microhardness and effective toughness as a function of final aluminum content.
Figure 12:
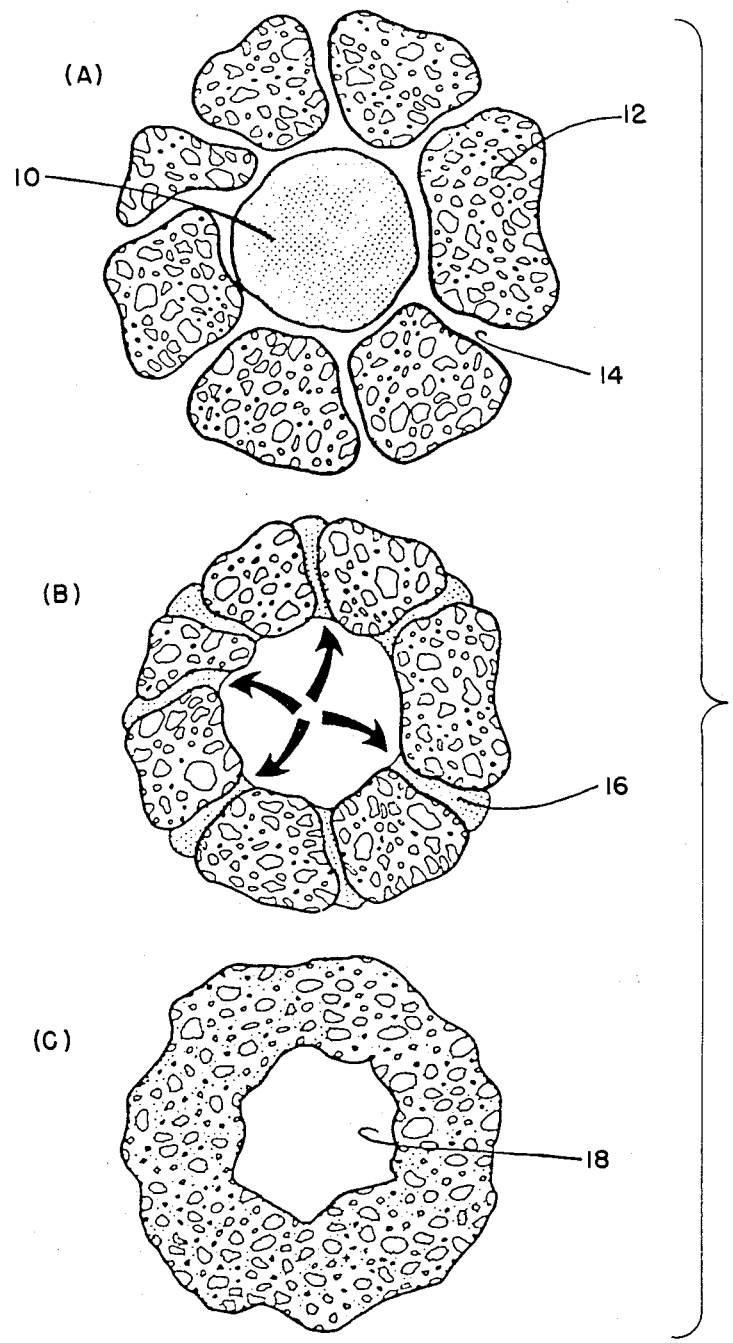
FIG. 12 is a schematic depiction of the liquid rearrangement mechanism in boron carbide-aluminum cermets.

The final properties, such as microhardness and effective toughness, are a function of final metal content, as shown in FIG. 11. The best overall mechanical properties are obtained where the retained aluminum metal phase is in the 24–33% range. The microhardness is maximized where the retained metal phase is in the 9–24% range. Furthermore, the fracture toughness value remains high in this same range. For maximum fracture toughness and fracture strength, the retained metal phase should be in the 33–40% range.

Where it is desired that a metal phase remain in the final boron carbide composite, the carbon-enriched boron carbide process is utilized to ensure that reaction rates are sufficiently slowed to avoid complete depletion of the aluminum introduced into the process. In this process, the boron carbide compact is sintered or heat treated at a temperature range of 1800°–2250° C. When the boron carbide is heat treated at a temperature range of 1800°–2100° C., the chemical reaction is slowed down, with a portion of the introduced metal remaining in the final composite but ceramic phases other than boron carbide being produced. FIG. 9 demonstrates the relationship between the initial boron carbide content and the final ceramic content in the boron carbide-aluminum system. When the boron carbide is heat treated to a temperature range of 2100°–2200° C., the chemical reactions are slowed down to a minimum and metal may be retained in the system in a desired amount without a major ceramic phase being present.

The second possible method for changing composite microstructure is by controlling the time, temperature and graphite content of the system. As a result, different densities, grain size and ceramic phase continuity can be obtained. This method has previously been discussed with respect to the impact of sintering conditions or parameters.

A third way of altering microstructure involves extra or post-heat treatments of already infiltrated composites at 900°–1150° C. As a result, a slow growth of ceramic phases takes place. The main phase that increases is ternary $AlB_{12}C_2$, which bridges boron carbide grains and forms continuous, interconnected skeletal phases. In this manner, the microstructure changes from a metal matrix type, as shown in FIG. 1, where the grains are separated from each other, coarsening and elongating into an interconnected, continuous, skeleton-type form, as shown in FIG. 3, where both ceramic and aluminum are present.

The changes in microstructure are directly reflected by changes in mechanical properties, as demonstrated in the examples provided below. When the aluminum alloys are used in infiltration, post-heat treatment according to technical specifications of the alloy should be used. For instance, for boron carbide-aluminum alloys, heat treatment between 175°–400° C. is required. By using aluminum alloys, the microhardness of the final composite can be increased 2.5 times compared to boron carbide-aluminum composites, while the fracture toughness remains high.

The following examples demonstrate the method and resulting boron carbide composition of the invention.

EXAMPLE 1

A boron carbide powder, ESK specification 1200 grit, manufactured by Elektroschemeltzwerk Kempten, Munich, West Germany, was dispersed in water at a pH of 8. The suspension was consolidated by slip casting in a plaster of Paris mold forming a porous compact. The compact was removed from the mold, dried at 45° C. for 12 hours and at 110° C. for 24 hours, yielding a green density of 52%. The compact was then heat treated in the graphite furnace at 2150° C. for 30 minutes. The theoretical density was 64%. Next, the porous boron carbide was infiltrated with liquid aluminum in the graphite furnace, under vacuum conditions of 10 millitorrs at 1190° C. for 30 minutes.

The final microstructure consists of 69% ceramic phases, including 64% boron carbide, a 5% mixture of $AlB_{12}C_2$, the unknown structure phase X and $AlB_{12}$ and 31% Al metal. "Continuity", defined as an average of the number of grains touching each other, is 3.5. The average boron carbide grain size is 8 $\mu$m and the mean free path is 4 $\mu$m. The fracture toughness is a $K_{IC}$ of 9.7 MPa.m$^{\frac{1}{2}}$, fracture strength ($\sigma$f) equal to 621 MPa, and Young's modulus of E=290 GPa.

EXAMPLE 2

The boron carbide power of Example 1, ESK 1200 grit, was dispersed in $H_2O$, pH 7.5, and slip cast in a plaster of Paris mold. The porous compact body was removed from the mold, dried at 45° C. for 12 hours and at 110° C. for 26 hours. The green density was 51.4%. Next, the compact was heat treated in the graphite furnace at 2200° C. for 30 minutes. The theoretical density was 69%. The porous boron carbide was then infiltrated by submerging in liquid aluminum at 1200° C. for 30 minutes under vacuum conditions.

The final microstructure consists of 70% ceramic and 30% metal phases. The average grain size of boron carbide is 10.7 $\mu$m and the mean free path is 4.9 $\mu$m. The microstructure is of the type where both ceramic and metal form interconnectional, continuous phases, as shown in FIG. 3.

The fracture toughness was 8.18 MPa.m$^{\frac{1}{2}}$ fracture strength was 580 MPa; and Young's modulus was 310 GPa, as shown in FIG. 5.

EXAMPLE 3

The boron carbide power of Example 1 was dispersed in $H_2O$, at pH 7, and slip cast in a plaster of Paris mold. The porous compact was removed from the mold, dried at 45° C. for 12 hours and at 110° for 24 hours. The green density was 50.8%. The compact was heat treated in the graphite furnace at 2050° C. for 30 minutes. The theoretical density was 52%. The porous boron carbide compact was then infiltrated with liquid aluminum at a temperature of 1170° C. for 30 minutes under vacuum conditions at 5 millitorrs.

The final microstructure consists of 72% ceramic and 28% metal phases. The boron carbide-aluminum composite is characterized by an average boron carbide grain size of 5 m and a mean free path of 2.6 $\mu$m. Further, $K_{IC}$ is 7.3 MPa.m$^{\frac{1}{2}}$, $\sigma$f=620 MPa and E=183 GPa. The microstructure is of the matrix type wherein most of the ceramic grains are separated from each other, as shown in FIG. 1.

EXAMPLE 4

A boron carbide powder, ESK grit 1500, was dispersed in $H_2O$, at a pH of 10, aged for 12 hours, cast in a plaster of Paris mold, removed from the mold, and dried at 45° C. for 12 hours and at 110° C. for 24 hours.

Solid concentration in the suspension was 45%, and the theoretical density of the green compact was 68%.

The compact was sintered in a graphite furnace at a temperature of 2050° C. for 45 minutes, in contact with a graphite plate. Theoretical density after sintering was 75%.

The compact was infiltrated by submerging in liquid aluminum at 1180° C. for 25 minutes, under vacuum conditions. A 100% theoretically dense composite with a specific density of 2.59 g/cm$^3$ was obtained.

The final microstructure consists of 80% ceramic and 20% metal phases. The average boron carbide grain size is 2.4 $\mu$m. The microstructure is of the FIG. 1 metal matrix type, wherein most of the ceramic grains are separated from each other. The fracture toughness is $K_{IC}$ 8.16 MPa.m$^{\frac{1}{2}}$.

The boron carbide-aluminum compound was then heat treated at 1200° C. for 45 minutes. The heat treatment resulted in grain coarsening and the $K_1C$ value decreased to 6.17 MPa.m$^{\frac{1}{2}}$.

A further 45-minute heat treatment at 1200° C. resulted in forming an interconnected, continuous ceramic phase containing mainly boron carbide and $AlB_{12}C_2$ of the FIG. 3 type. The fracture toughness $K_1C$ value declined to 4.15 MPa.m$^{\frac{1}{2}}$, but microhardness (Knoop scale) increased to $K_{(1000\ g)}$ 890–950.

EXAMPLE 5

The boron carbide of Example 4 (ESK 1500) was dispersed, cast, dried and infiltrated under conditions identical to those of Example 4.

After infiltration, a heat treatment of 1700° C. for 2 hours in graphite furnace was conducted. The green density achieved was 68%, and the sintered compact density was 69%. The infiltrated composite was fully densified with aluminum. During 25 minutes of the infiltration process, more than 60% of aluminum was depleted to form $AlB_{12}$, $AlB_{12}C_2$, $AlB_2$ and the unidentified phase X.

The amount of metal retained in the composite was 14–16%. Further heat treatment at a temperature range of 1100° C. to 1200° C. led to complete depletion of aluminum in 65 minutes. The resulting microstructure comprises small boron carbide grains surrounded by other ceramic phases, such as $AlB_{12}$, $AlB_{12}C_2$, $AlB_2$, phase X and $Al_4C_3$.

The fracture toughness $K_{IC}$ value of the 94% multiphase ceramic, 6% metal composite is 5.15 MPa.m$^{\frac{1}{2}}$. Fracture strength is 540 MPa and microhardness (Knoop scale) is $K_{(1000\ g)}$1030. See FIG. 9.

EXAMPLE 6

The boron carbide of Example 4 was dispersed in H$_2$O adjusted to a pH of 10.5, and pressure cast under 500 psi pressure. The green theoretical density of the resulting compact is 68.5%.

The compact was then heat treated at 1825° C. for 10 hours in contact with graphite to enrich the carbon content of the boron carbide composition. The theoretical density after heat treatment was 69%. An aluminum powder, Alcoa 1401, was placed on top of the compact. Infiltration of the compact with the aluminum was conducted in the graphite furnace under 10 millitorrs vacuum conditions, at 1170° C. for 25 minutes. The microstructure is characterized by very fine 1.7 μm boron carbide grains and total ceramic phases of 78%. K$_{IC}$ value is 8.16 MPa.m$^{\frac{1}{2}}$, Knoop microhardness is 840, and σf is 600 mPa.

EXAMPLE 7

Boron carbide powder (ESK 1500) was heat treated in a graphite crucible, in a graphite furnace at a temperature of 2175° C. for 45 minutes.

The resulting boron carbide agglomerations were crushed and ball milled for 48 hours.

A. A portion of boron carbide powder was cold pressed at 5 ksi and then isostatically pressed under 30 ksi of pressure to a theoretical density of 57%. Next, porous compacts were infiltrated with aluminum at 1180° C. under vacuum conditions (5 millitorrs) to full density. The microstructure obtained is of the metal matrix type, with a total ceramic content of 68%. A continuity value of 1.45 was observed.

B. A second portion of the boron carbide powder was dispersed in water adjusted to a pH 10. The suspension was cast in a plaster of Paris mold, removed from the mold and dried. Theoretical green density was 61%.

The porous compact was infiltrated with liquid aluminum in the graphite furnace, under vacuum conditions at 1180° C., to full density. The final microstructure includes 70% ceramic phases in a metal matrix form similar to that shown in FIG. 1.

EXAMPLE 8

A boron carbide powder ESK 1500 was dispersed in H$_2$O adjusted to a pH 9. The suspension was slip cast in a plaster of Paris mold, removed and dried, achieving a green density of 66%. The compact was heat treated in the graphite furnace at 2100° C. for 30 minutes. The theoretical density achieved was 77%. Next, the porous compact was infiltrated with liquid aluminum, under vacuum conditions (10 millitorrs) at 1250° C. for one hour. In the final microstructure, the ceramic phase forms a continuous skeleton similar to the form shown in FIG. 3. The total ceramic phase is 88% of the structure, including principally AlB$_{24}$C$_4$, AlB$_{12}$, phase X and AlB$_{12}$C$_2$. The Knoop microhardness is K$_{(1000 g)}$=1350, K$_{IC}$ is 6.72 MPa.m$^{\frac{1}{2}}$, and of is 390 MPa.

EXAMPLE 9

The boron carbide of Example 4 was dispersed in H$_2$O adjusted to a pH of 10.0 and pressure cast under 500 psi pressure. The green theoretical density of the resulting composite was 68%.

The composite was heat treated at 1900° C. in direct contact with graphite to enrich the carbon content of the boron carbide composition. A metal 2024 aluminum alloy (4.4% Cu, 0.6% Mn, 1.5% Mg) infiltration of the compact was conducted in the presence of graphite under 10 millitorrs of pressure at 1200° C. for 15 minutes. The compact was then heat treated at 190° C. under an argon atmosphere for 18 hours.

The microstructure of the resulting ceramic is characterized by very fine boron carbide grains, the total amount of ceramic is 80%, Knoop microhardness is K$_{(1000 g)}$=1580, and K$_{IC}$ is 5.81 MPa.m$^{\frac{1}{2}}$.

EXAMPLE 10

The boron carbide of Example 4 was treated as in Example 9 up to the infiltration stage. The compact was infiltrated with aluminum alloy 7075 (1.6% Cu, 2.5% Mg, 0.23% Cr, 5.6% Zn). After infiltration, samples were heat treated at 175° C. for 28 hours.

The resulting matrix-type microstructure is characterized by very fine grains. The Knoop microhardness K$_{(1000 g)}$ is 1266, K$_1$C is 6.18 and strength is 555 MPa. Boron carbide content is 75% and total ceramic content is 82%.

EXAMPLE 11

The boron carbide of Example 4 was dispersed in H$_2$O with a pH adjusted to 10.0 to form a suspension. The suspension was slip cast in a plaster of Paris mold, removed and dried, giving a compact with a green density of 60%.

The compact was heat treated in the graphite furnace at 2125° C. for 30 minutes. The theoretical density achieved was 78%.

The porous compact was then infiltrated with liquid aluminum alloy (7075) under vacuum conditions at 1240° C. for 1 hour, and heat treated at 175° for 28 hours.

The final microstructure of the ceramic phase is a continuous skeleton. The total ceramic phase is 90%. The Knoop microhardness K$_{(1000 g)}$ is 2400, K$_{IC}$ is 5.74 MPa.m$^{\frac{1}{2}}$ and strength is 450 MPa.

We claim:

1. A method of making a boron carbidealuminum composite, comprising:
    heating a particulate boron carbide in the presence of free carbon to 1800°–2250° C. wherein the resulting boron carbide exhibits a substantially reduced reaction rate with aluminum; and
    reacting said boron carbide with aluminum, wherein a boron carbide-aluminum composite is formed having a microstructure including principally boron carbide and aluminum metal homogeneously distributed throughout said composite.

2. The method of claim 1 wherein the heated boron carbide is characterized by a composition close to the carbon-rich end of the boron carbide's solid solution range.

3. The method of claim 1 wherein the free carbon present is graphite.

4. The method of claim 1 wherein said aluminum constitutes 1-40 % by volume of the composite.

5. An article of manufacture, comprising:
    a boron fiber coated with a boron carbide aluminum composite made by the method of claim 1.

6. The method of claim 1 wherein said aluminum metal phase is an alloy selected from the group consisting of Al-Cu, Al-Mg, Al-Si, Al-Mn-Mg and Al-Cu-Mg-Cr-Zn or mixtures thereof.

7. The method of claim 6 wherein said aluminum alloy constitutes 1-40% by volume of the composite.

8. The method of claim 1 wherein heating said boron carbide is conducted at about 2,100° to 2,250° C. for at least about 30 minutes.

9. A method of making a boron carbide-aluminum composite of selected ceramic and metal content and microstructure, having high fracture toughness, fracture strength and Young's modulus, and low density, comprising;
dispersing a particulate boron carbide of less than 10 micrometers average particle size in water at a pH selected to maximize electrostatic repelling forces on boron carbide particle surfaces;
consolidating said boron carbide into a porous compact;
sintering said compact, whereby an open porous structure is retained;
infiltrating said compact with aluminum; and
heat treating said compact, whereby a voidless composite is formed having a plurality of microstructure phases.

10. The method of claim 9 wherein sintering is at about 1800°–2250° C. in the presence of graphite, whereby subsequent reaction rates of boron carbide with aluminum are substantially reduced and composites are formed having a microstructure that is principally boron carbide and aluminum.

11. The method of claim 10 wherein said graphite is a particulate dispersed with said boron carbide, or where the boron carbide sample is immersed in a graphite powder bath without prior powder mixing.

12. The method of claim 10 wherein said composite has microstructure comprising separate aluminum and ceramic phases each in an interconnected continuous form.

13. The method of claim 9 wherein consolidating said boron carbide is accomplished by slip casting.

14. The method of claim 9 wherein consolidating said boron carbide is accomplished by injection molding.

15. The method of claim 9 wherein consolidating said boron carbide is accomplished by isostatic pressing.

16. The method of claim 9 wherein consolidating said boron carbide is accomplished by pressure casting.

17. The method of claim 9 wherein infiltration is achieved by submerging said porous compact in liquid metal aluminum.

18. The method of claim 17 wherein said infiltration is conducted at 1150°–1250° C.

19. The method of claim 9 wherein said infiltrating aluminum is an aluminum alloy selected from the group consisting of Al-Cu, Al-Mg, Al-Si, Al-Mn-Mg, and Al-Cu-Mg-Cr-Zn or mixtures thereof, and said infiltration is conducted at a temperature and for a period of time whereby the contact angle of said alloy with said composite is less than 45°.

20. The method of claim 19 wherein said heat treating is accomplished at 170°–400° C.

21. The method of claim 9 wherein said boron carbide particulate is of 5 micrometers average particle size and the pH is greater than about 5, resulting in a boron carbide suspension of 27% by volume boron carbide, and compact density of 50–52% by volume.

22. The method of claim 9 wherein said boron carbide particulate is about 1 micrometer average particle size and pH is about 6–11, resulting in a boron carbide suspension of about 45–50% by volume boron carbide, and compact density of 66–68% by volume.

23. A low-density boron carbide-aluminum composite produced by heating a particulate boron carbide in the presence of free carbon to 1800°–2250° C. such that the resulting boron carbide exhibits a substantially reduced reaction rate with aluminum and reacting said carbon-enriched boron carbide with aluminum, wherein a boron carbide-aluminum composite is formed having a microstructure including principally boron carbide and aluminum metal phases.

24. The composite of claim 23 wherein the enriched boron carbide is characterized by a composition close to the carbon-rich end of the boron carbide's solid solution range.

25. The composite of claim 23 wherein the free carbon present is graphite.

26. The composite of claim 23 wherein said aluminum phase constitutes 1–40 % by volume of the composite.

27. A low-density boron carbide-aluminum composite produced by:
dispersing a particulate boron carbide of less than 10 micrometers average particle size in water at a pH selected to maximize electrostatic repelling forces on boron carbide particle surfaces;
consolidating said boron carbide into a porous compact;
sintering said compact, whereby an open porous structure is retained;
infiltrating said compact with aluminum; and
heat treating said compact, whereby a voidless composite is formed having a plurality of microstructure phases.

28. The composite of claim 27 wherein said sintering is at about 1800°–2250° C. in the presence of graphite, whereby subsequent reaction rates of boron carbide with aluminum are substantially reduced and composites are formed having a microstructure that is principally boron carbide and aluminum.

29. The composite of claim 28 wherein said graphite is a particulate dispersed with said boron carbide or where the boron carbide sample is immersed in a graphite powder bath without prior powder mixing.

30. The composite of claim 28 wherein said composite has a microstructure comprising separate aluminum and ceramic phases each in an interconnected, continuous form.

31. The composition of claim 28 wherein said aluminum phase constitutes 1–40 % by volume of the composite.

32. The composite of claim 27 wherein infiltration is achieved by submerging said porous compact in liquid metal aluminum.

33. The composite of claim 32 wherein said infiltration is conducted at 1150°–1250° C.

34. The composite of claim 27 wherein said infiltrating aluminum is an aluminum alloy selected from the group consisting of Al-Cu, Al-Mg, Al-Si, Al-Mn-Mg, and Al-Cu-Mg-Cr-Zn, or mixtures thereof, and said infiltration is conducted at a temperature and for a period of time whereby the contact angle of said alloy with said composite is less than 45° C.

35. The composite of claim 34 wherein said heat treating is accomplished at 170°–400° C.

36. The composite of claim 27 wherein said boron carbide particulate is of 5 micrometers average particle size and the pH is greater than about 5, resulting in a boron carbide suspension of about 27% by weight boron carbide, and compact density of 50–50% by weight.

37. The composite of claim 27 wherein said boron carbide particulate is about 1 micrometer average particle size and pH is about 6–11, resulting in a boron carbide suspension of about 45–50% by weight boron carbide, and compact density of 66–68% by weight.

* * * * *